INVENTORS
D. B. BAKER
C. R. ROGERS
W. O. BECHMAN
BY Paul O. Pippel
ATTY.

INVENTORS
D. B. BAKER
C. R. ROGERS
W. O. BECHMAN

BY Paul O. Pippel

ATTY.

Patented Feb. 10, 1942

2,272,287

UNITED STATES PATENT OFFICE 2,272,287

BRAKE CONTROL MECHANISM

David B. Baker, Riverside, Clifford R. Rogers, Oak Park, and William O. Bechman, Chicago, Ill., assignors to International Harvester Company, a corporation of New Jersey Application December 19, 1939, Serial No. 310,020

1 Claim. (Cl. 188—196)

This invention relates to a brake control mechanism for a vehicle, and more particularly to such a mechanism for a vehicle of the tractor type, in which the brake mechanisms are contained respectively in the housings forming part of the tractor main body or frame.

The invention contemplates and has for its principal object the provision of a brake control means including a brake control member which may be adjusted to a position to suit the vehicle operator without altering the adjustment of the brake mechanism itself. Conversely, the arrangement provides for adjustment of the brake mechanism or the connecting linkage therefor without interfering with the selected position of the brake control member.

An important object is to provide means for locking the brake mechanism in applied position.

Another object is to provide means within easy reach of and controllable by the vehicle operator for locking the brake mechanism in position or releasing the same therefrom.

And, another object is to provide a brake mechanism and control arrangement in which a major portion of the brake mechanism and operating linkage is entirely enclosed within a housing forming part of the vehicle, and wherein the adjustable parts are disposed outside of the housing to be readily accessible for easy adjustment.

Briefly and specifically, these and other important objects and features are attained in one preferred form of the invention in connection with a vehicle of the crawler tractor type. The tractor includes a main frame having a housing containing the brake mechanism. The housing also contains a major portion of the operating linkage for the brake mechanism. A transverse rock-shaft is journaled in the housing, and its inner end is associated with the brake mechanism connecting linkage and its outer end with an upstanding arm rigidly carried thereon. An upwardly extending brake pedal is journaled on the rock-shaft and extends upwardly through the platform adjacent the operator's station. Releasable means connect the arm and the pedal for movement together, this means permitting adjustment of the arm or the pedal without interfering with the other. The frame also carries a locking means readily accessible to a tractor operator for locking the brake pedal in depressed position. A more complete understanding of these and other desirable objects of the invention may be had from the following detailed description taken in conjunction with the accompanying sheets of drawings, wherein:

Figure 1:
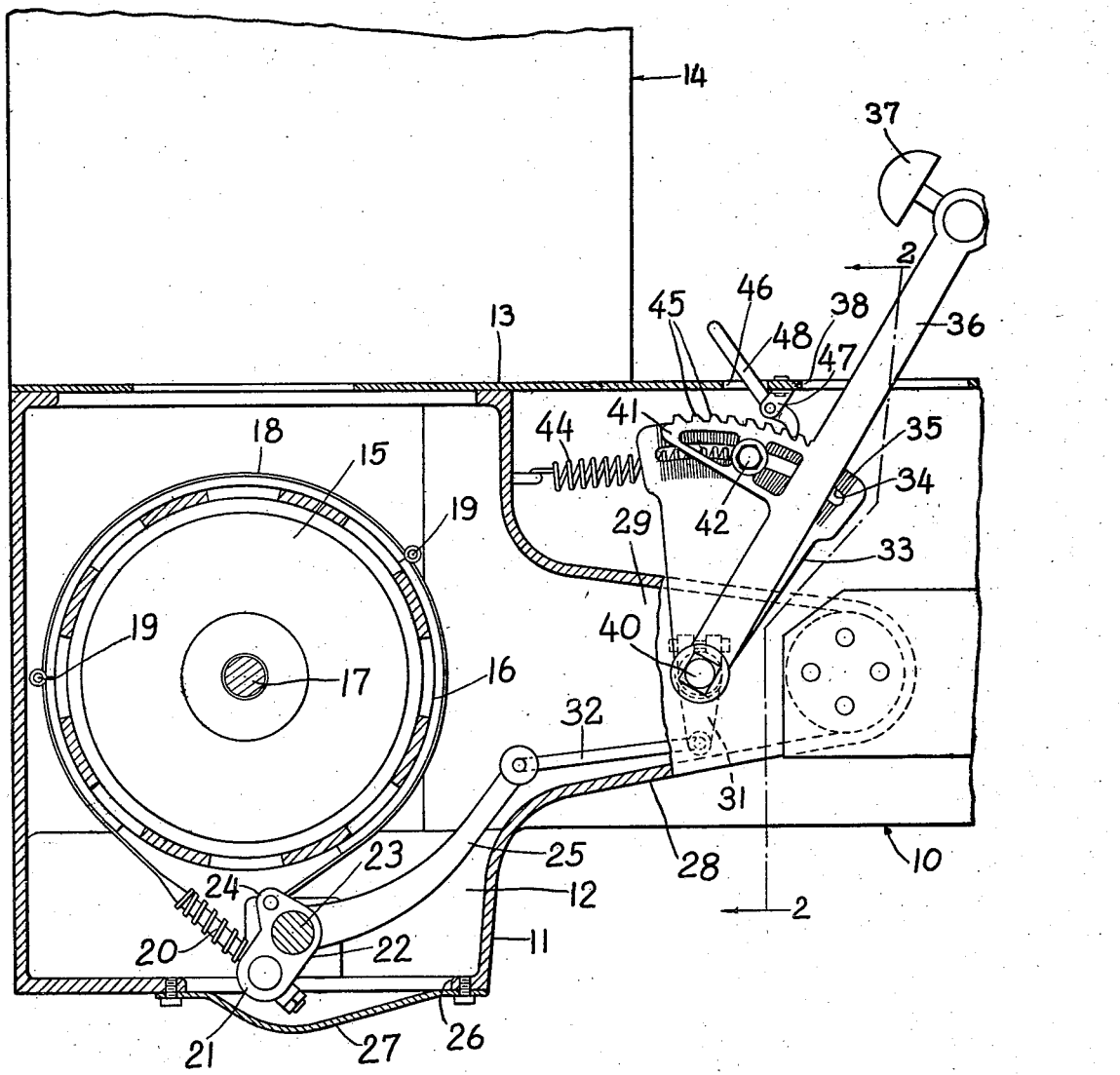
Figure 1 is a side elevational view, partly in section, showing the relation between the brake mechanism and the control means.

The construction illustrated herein for the purposes of disclosing the present invention is a tractor construction including a main frame or main body 10, at the rear end of which is located an enlarged housing portion 11 provided with a compartment 12. This compartment 12 is one of a pair of said compartments housing portions of the final drive mechanism, as is well understood by those skilled in the art. For the purposes of the present invention, since both sides of the vehicle are the same, only one side is illustrated and described.

The compartment 12 is open at its top, and is closed by a cover plate in the form of a platform 13, extending longitudinally of the body 10 and including an operator's station generally represented by the numeral 14.

The compartment 12 contains therein a rotating element 15 including a brake drum portion 16, a shaft 17, on which said element is carried, being suitably connected to the ground supports, not shown, of the tractor. The brake drum 16 is encircled by a brake band 18, preferably formed of three parts pivotally interconnected by transverse pins 19. One end of the brake band assembly is connected through the medium of a connecting bolt 20, to a lever arm 21 of a bell-crank 22 carried on a transverse rock-shaft 23 located at the bottom of the compartment 12. The crank 22 includes a second arm 24, to which the other end of the band assembly 18 is connected. The bell-crank 22 is rigidly secured to the rock-shaft 23 and is adapted to be rocked by a forwardly and upwardly extending arm 25, which is also rigidly carried by the rock-shaft. The bottom of the compartment 12 is formed with an opening 26 normally closed by a removable cover plate 27. This plate may be removed to provide access to the brake operating parts previously described.

The housing 11 includes a forwardly extending portion 28 providing a secondary housing 29 extending forwardly along one side of the body 10. A transverse rock-shaft 30 is journaled in the body at this point, the inner end of the rock-shaft carrying rigidly thereon a downwardly depending arm 31 pivotally connected by a compression link 32 to the forward and upper end of the operating arm 25. It will be seen that angular movement of the rock-shaft 30 will cause tightening of the brake band assembly 18 about the drum 16 of the rotating part 15.

The rock-shaft 30 carries rigidly thereon at its end outside the housing an upstanding arm or member in the form of a plate 33 having an upper planar portion extending generally arcuately in the direction of movement thereof. As shown in Figure 1, this part 33 is formed generally as a segment of a circle and has formed therein an arcuate slot 34. The outer face of said member at opposite sides of the slot 34 is serrated or formed with a plurality of angularly spaced notches, as at 35.

Figure 2:
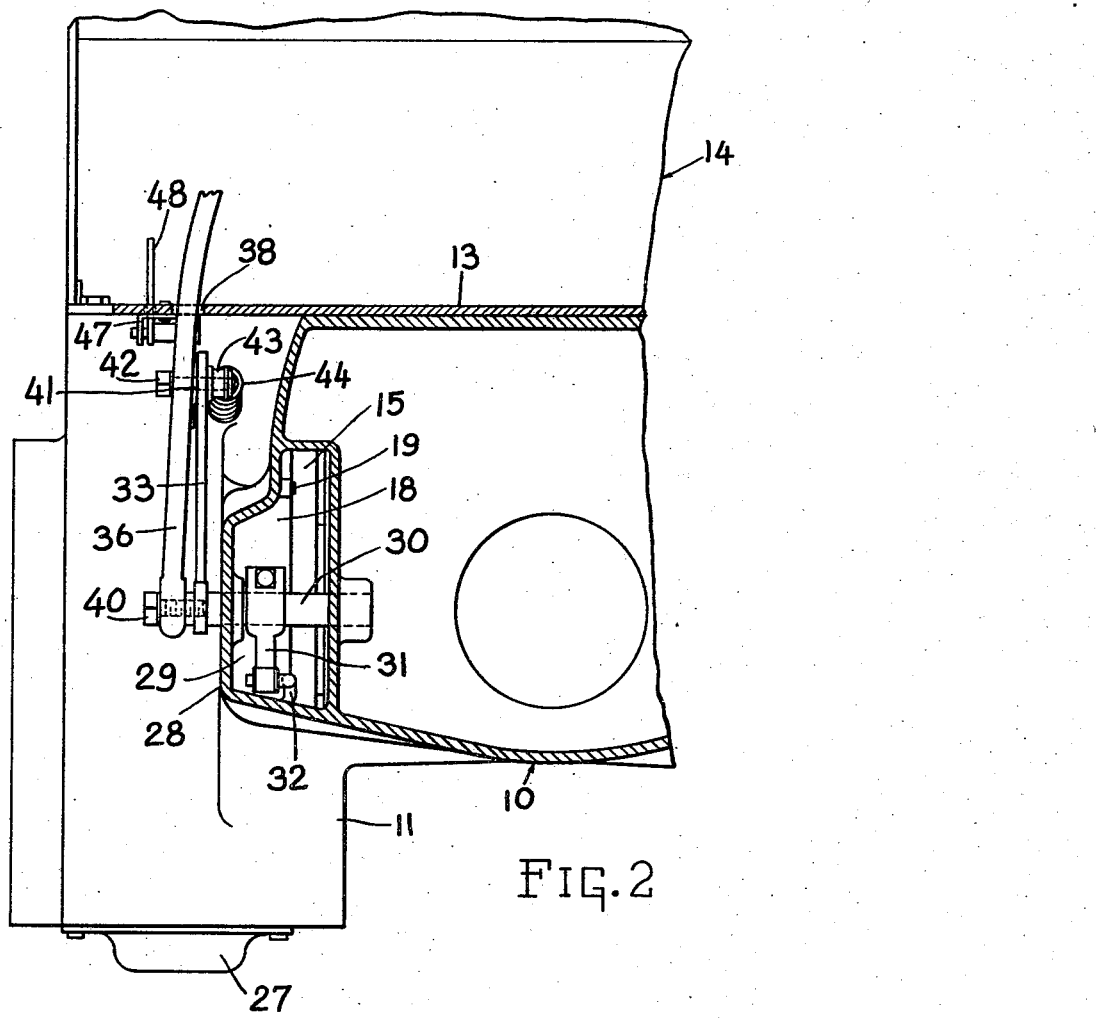
Figure 2 is a partial end view, taken substantially along the line 2—2 of Figure 1; and, Figure 3 is an enlarged sectional view, illustrating the relation between the control member and the operating rock-shaft.
Figure 3:
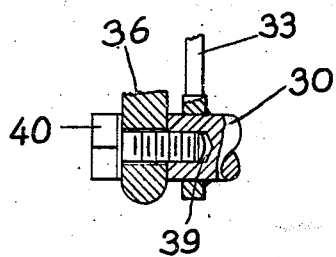

All of the parts just described are located below the platform 13, which, as shown in Figure 2, extends laterally of the body 10 over the upper portion of the member 33. The rock-shaft 30 has journaled at the outer end thereof, adjacent the member or plate 33, an upwardly extending control member in the form of a brake arm 36 including a brake pedal 37 at the upper end thereof. The platform 13 is formed with an elongated, longitudinally extending slot 38, which accommodates the brake pedal arm and movement thereof. The manner in which the brake pedal arm is attached to the rock-shaft 30 is shown in detail in Fig. 3. The other end of the rock-shaft 30 is provided with an axially threaded bore 39 into which a stud 40 is threaded to hold the arm 36 in place.

An intermediate portion of the arm 36 is provided with an integral arcuate portion 41, which in the assembly is arranged below the platform 13 generally cooperative with the arcuate portion of the member 33. The portion 41 is adapted to receive a bolt 42 which extends through the slot 34 in the member 33. This bolt receives a nut 43, which clamps the parts 33 and 37 together. The arcuate portion 41 of the member 37 is preferably notched or serrated to cooperate with portion 35 of the member 34, to provide for movement of the parts together as clamped in selected position by the bolt 42. The innermost end of the bolt 42 is connected to the forward end of a return spring 44 carried by a forward wall portion of the housing 11, as best shown in Figure 1. The arcuate portion 41 is provided along its upper edge with a series of notches 45. The platform 13 is formed with a second opening 46 located rearwardly of the aforementioned opening 38. The under side of the platform at this point carries a bracket 47 having a depending ear on which is pivoted a locking member 48. The member 48, while pivoted below the platform 13, extends above the platform through the opening 46 therein, thus disposing a portion of the locking member in proximity to the operator's station 14. The portion of the member 48 below the platform 13 is provided with a portion adapted to engage any one of the notches 45 in the portion 41 of the part 37. The locking member 48 is thus readily releasable from or engageable with the brake pedal arm to permit free movement of the arm or to lock the same in depressed position with the brake applied. The member 48 normally remains in disengaged position because of the weight of that portion thereof which extends above the platform 13.

In the operation of the brake control mechanism the brake pedal member 36 is, of course, utilized to actuate the brake mechanism for applying the brake. As previously mentioned, the brake pedal member may be locked in any selected position by means of engagement between the locking member 48 and the notches 45 formed on the portion 41 of the arm 36. The position of the brake pedal arm 36 may be adjusted to suit the desires of the vehicle operator. This selected positioning is accomplished by first loosening the bolt 42, which connects the parts 33 and 36 together, and then moving the part 36 until the brake pedal is disposed in the desired position. The bolt 42 is again tightened. It will be noted that this adjustment may take place without varying the position of the member 33. Since this member 33 is carried rigidly by the rock-shaft 30, it follows that adjustment of the brake hand assembly 18 is not interfered with.

Conversely, the arrangement provides for adjustment of the brake mechanism without interfering with the selected position of the brake pedal arm 36. Such adjustment becomes necessary as the brake band 18 becomes worn. This adjustment is made by first loosening the bolt 42 and then moving the part 33 angularly until the desired adjustment is attained. The brake pedal arm 36 in the meantime is held in its selected position. For this purpose it may be found useful to engage the locking member 48 with the notches in the portion 41. This will serve as a guide for maintaining the position of the arm 36.

Certain adjustments may be made in the brake mechanism through the medium of the connecting parts 20 and 21, previously described. These adjustments are made in an obvious manner by removing the cover plate 27 from the bottom of the housing 11. In the event that such adjustments alter the position of the brake pedal arm 36, said arm may be readjusted to the desired position in the manner defined above.

From the foregoing description it will be seen that an improved brake control arrangement has been provided for the brake mechanism of a vehicle and that certain special arrangements have been made for adjusting parts of the operating mechanism independently of other parts. It will be appreciated, of course, that only a preferred construction has been shown and that numerous modifications and alterations may be made therein without departing from the spirit and scope of the invention as defined in the appended claim.

What is claimed is:

In a vehicle including a frame having a housing, drive mechanism for the vehicle, and brake mechanism for the driving mechanism and included within said housing, the combination with the brake mechanism of operating means therefor including a rock-shaft journaled on the frame and extending within and without the housing, operating linkage contained wholly within the housing and operatively connected between the brake mechanism and the housed end of the rock-shaft, an arm rigidly carried on the rock-shaft outside the housing, a control member journaled on the rock-shaft outside the housing and adjacent the arm, and releasable means securing the arm and member together for movement together, said means being releasable to permit relative movement between the arm and member for varying the position of one independently of the other.

DAVID B. BAKER.
CLIFFORD R. ROGERS.
WILLIAM O. BECHMAN.